United States Patent
Fodor (10) Patent No.: US 7,899,478 B2
(45) Date of Patent: Mar. 1, 2011

(54) METHOD AND APPARATUS FOR COMMUNICATING MESSAGES IN A COMMUNICATIONS NETWORK

(75) Inventor: Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 597 days.

(21) Appl. No.: 11/667,722

(22) PCT Filed: Nov. 24, 2004

(86) PCT No.: PCT/SE2004/001726

§ 371 (c)(1),
(2), (4) Date: Dec. 4, 2007

(87) PCT Pub. No.: WO2006/057580

PCT Pub. Date: Jun. 1, 2006

(65) Prior Publication Data

US 2008/0201407 A1 Aug. 21, 2008

(51) Int. Cl.
*H04Q 7/20* (2006.01)
*H04B 7/00* (2006.01)

(52) U.S. Cl. ............. 455/518; 455/412.2; 455/414.1; 455/515

(58) Field of Classification Search ............. 455/412.2, 455/414.1, 416, 415, 517, 518, 519, 520, 455/515, 445, 446; 370/310; 709/203, 227
See application file for complete search history.

(56) References Cited

U.S. PATENT DOCUMENTS 6,763,226 B1 7/2004 McZeal

| | | | |
|---|---|---|---|
| 2003/0023691 A1* | 1/2003 | Knauerhase | 709/206 |
| 2003/0149774 A1* | 8/2003 | McConnell et al. | 709/227 |
| 2004/0015547 A1 | 1/2004 | Griffin | |
| 2004/0202117 A1* | 10/2004 | Wilson et al. | 370/310 |

FOREIGN PATENT DOCUMENTS

| | | |
|---|---|---|
| WO | WO 02/093954 | 11/2002 |
| WO | WO 2004/014089 | 2/2004 |
| WO | WO 2004/036787 | 4/2004 |
| WO | 2004/100419 | 11/2004 |

OTHER PUBLICATIONS

International Search Report of PCT/SE2004/001726, mailed Jun. 16, 2005.
International Preliminary Report on Patentability w/amended sheets.
Written Opinion of the International Preliminary Examining Authority.
Written Opinion of the International Searching Authority.
Summary of Japanese official action, Oct. 4, 2010, in corresponding Japanese Application No. 2007-542962.

* cited by examiner

*Primary Examiner* — John Lee
(74) *Attorney, Agent, or Firm* — Nixon & Vanderhye P.C.

(57) ABSTRACT

A method of acquiring interoperability between a push to talk server and a chat server is disclosed. A push to talk server comprises an interface adapted to receive requests from another server to send messages to push to talk clients via the push to talk server. A chat server comprises an interface adapted to send to the push to talk server a request for permission to send chat messages to push to talk clients. A computer program product is described for communicating messages in a communication network comprising a push to talk server and a chat server.

23 Claims, 8 Drawing Sheets

METHOD AND APPARATUS FOR COMMUNICATING MESSAGES IN A COMMUNICATIONS NETWORK

This application is the US national phase of international application PCT/SE2004/001726, filed 24 Nov. 2004, which designated the U.S., the entire content of which is hereby incorporated by reference.

TECHNICAL FIELD

The technical field relates to the field of information technology, and in particular to the communication of voice and data messages between users in a communications network.

BACKGROUND

The use of computers for exchanging messages and opinions in so called Internet chat rooms has proved to be a popular way of communicating with other people. By logging in to a chat room, a user of a computer that is connected to the Internet can participate in a chat room, and hence readily deliver messages to a large number of people logged in to the chat room, most of which are initially unknown to the user. For many chat room participants, the chat room discussions become a part of daily life. Chat room participants typically discuss around one, or a few, topics at a time, and the messages related to a discussed topic are referred to as a thread. Chat room participants are often keen on following and impacting the development of the thread. Furthermore, chat room participants sometimes agree on a time at which two or more chat room participants will enter the chat room for a virtual rendezvous.

In order to impact a thread, take part in a virtual rendezvous, or to take part in any other chat room activity, a computer with an Internet connection is required. When a chat room participant does not have access to a computer with an Internet connection, he/she will not be able to participate in the chat room discussions.

SUMMARY

A problem to which the present technology relates is how to facilitate for a user of an Internet chat room to take part in a chat room discussion when no computer with Internet connection is available.

This problem is addressed by a push to talk server for forwarding push to talk messages in a mobile radio network, the server comprising an interface for receiving, from push to talk clients, requests to send push to talk messages; an interface for receiving push to talk messages to be forwarded; an interface for transmitting push to talk messages to push to talk clients; and a granting mechanism for granting, to one push to talk client at a time, permission to send push to talk messages. The push to talk server comprises an interface adapted to receive requests from another server to send messages to push to talk clients via the push to talk server; an interface adapted to receive messages from said another server; and an interface adapted to transmit push to talk messages to said another server. Furthermore, the granting mechanism is adapted to handle a request from said another server.

The problem is also addressed by a chat server for forwarding chat messages in a computer network, the chat server comprising an interface for receiving, from chat clients, chat messages to be forwarded; and an interface for transmitting chat messages to chat clients. The chat server comprises an interface adapted to receive push to talk messages from the push to talk server; an interface adapted to transmit chat messages to said push to talk server; and an interface adapted to send, to said push to talk server, a request for permission to send chat messages to push to talk clients.

The problem is further addressed by a method of acquiring inter-operability between a push to talk server and a chat server, the push to talk server for forwarding push to talk messages to and from push to talk clients and the chat server for forwarding chat messages to and from chat clients, said method comprising exchanging at least one control message between the push to talk server and the chat server; and sending at least a push to talk message from the push to talk server to the chat server for forwarding to at least one chat client or a chat message from the chat server to the push to talk server for forwarding to at least one push to talk client.

The method achieves that a push to talk user and a chat room participant can exchange messages. By the push to talk server is achieved that a push to talk server can forward push to talk messages to chat clients, via a chat server, and forward chat messages to push to talk clients. By the chat server is achieved that a chat server can forward chat messages to push to talk clients, via a push to talk server, and that the chat server can forward push to talk messages to chat clients. Thus, a push to talk user and a chat room participant can exchange messages with each another. A person can hence take part in a chat room discussion by use of a push to talk client, which requires no Internet connection and experiences the full advantage of the vast coverage of a mobile radio communications network.

In one aspect of the method, the exchanging of at least one control message comprises sending a request message, from the chat server to the push to talk server, for permission to send chat messages to push to talk clients; and the sending of chat messages from the chat server comprises sending at least one chat message from the chat server to the push to talk server when the chat server has said permission. Hereby is achieved that the push to talk server and the chat server can agree upon the timing for the granting of permission to send chat messages from the chat server to the push to talk server.

In one aspect of the push to talk server, the granting mechanism is adapted to give priority to a request received from said another server over requests received from a push to talk client. Hereby is achieved that the granting of permission to the another server to send chat messages becomes more predictable.

In one aspect, a method comprises monitoring a first variable parameter; comparing the value of said first variable parameter with a first pre-determined value; and, when the value of said first variable parameter equals said first pre-determined value, withdrawing said permission to send from the chat server. Hereby is achieved that the withdrawal of the permission from the another server becomes more predictable. By correctly selecting the first pre-determined value, the delay in delivering chat messages to push to talk users, as well as the time that a push to talk user has to wait until permission to send push to talk messages is granted to the push to talk user, can be minimised.

In one embodiment of this aspect, the push to talk server comprises a withdrawal mechanism adapted to determining when to withdraw the permission to send chat messages from said another server after having granted said permission to said another server. The withdrawal mechanism could e.g. comprise a monitor for monitoring a variable parameter, and wherein said withdrawal mechanism is adapted to compare the value of said variable parameter with a pre-determined number in said determining. In another embodiment of this aspect, the chat server comprises a withdrawal mechanism adapted to determine when to withdraw the permission to send chat messages from said chat server after having received said permission from said push to talk server.

In one embodiment of this aspect, the push to talk server comprises a mechanism for dynamically determining said pre-determined number. Hereby is achieved that the delay in delivering chat messages to push to talk users, as well as the time that a push to talk user has to wait until permission to send push to talk messages is granted to the push to talk user, can be optimised as the ratio between the number of chat messages and the number of push to talk messages varies.

In one aspect of the method, the exchanging at least one control message between the push to talk server and the chat server comprises exchanging at least one control message comprising an identity identifying the chat server to the push to talk server as an entity to which permission to send messages may be granted. In this aspect of the invention, the chat server comprises storage for a push to talk identity, and the interface adapted to send a request for permission is adapted to include said push to talk identity in said request. Hereby is achieved that the push to talk server recognises that the request originates from the chat server.

In another aspect, the method comprises monitoring a second variable parameter; comparing the value of said second variable parameter with a second pre-determined value; and, when the value of said second variable parameter equals said second pre-determined value, performing said step of sending a request. Hereby is achieved that the delay in delivering chat messages to push to talk users, as well as the time that a push to talk user has to wait until permission to send push to talk messages is granted to the push to talk user, can be minimised. In one embodiment of this aspect of invention, the chat server further comprises a mechanism for determining when to send a request for permission to send chat messages to push to talk clients.

The problem is also addressed by a communications network comprising a push to talk server and a chat server. The communications network preferably comprises a text/speech converter for converting chat messages into speech, and for converting push to talk messages into text.

The problem is further addressed by a computer program product for communicating messages in a communications network comprising push to talk clients capable of sending push to talk messages and a push to talk server having a granting mechanism for granting permission to push to talk clients to send push to talk messages, the computer program product being characterised by computer program code which, when run on a computer, forwards push to talk messages, received from push to talk clients, to a chat server (210); computer program code which, when run on a computer, can receive, from the chat server, a request for permission to send chat messages to push to talk clients; and computer program code which, when run on a computer, can grant said permission to the chat server in response to said request.

The problem is also addressed by a computer program product for communicating messages in a communications network comprising chat clients capable of sending chat messages and a chat server capable of forwarding the chat messages to chat clients, the computer program product being characterised by computer program code which, when run on a computer, can send, to a push to talk server, a request for permission to send chat messages to push to talk clients; computer program code which, when run on a computer, can receive said permission from the push to talk server; computer program code which, when run on a computer, forwards chat messages, in response to receiving said permission, to the push to talk server.

Hereby is achieved that the sending of chat messages to push to talk clients and the sending of push to talk messages to chat clients is facilitated.

BRIEF DESCRIPTION OF THE DRAWINGS

Reference is now made to the following descriptions taken in conjunction with the accompanying drawings, in which.

DETAILED DESCRIPTION

Recently, the functionality of mobile radio communication networks has been expanded to include a Push To Talk (PTT) service, i.e. a service which facilitates for users of the mobile radio communications network to perform one-way communication with other users in the mobile radio communications network, in a walkie-talkie fashion. Typically, voice messages are transferred from a mobile station to one or several mobile stations by use of one or more packet data protocols. In this way, a mobile radio communications network is utilized in a manner so that a mobile station can be ready to receive a voice message at any time, without occupying a dedicated radio channel, but still experiencing the full advantage of the vast coverage of the mobile radio communications network.

Figure 1:
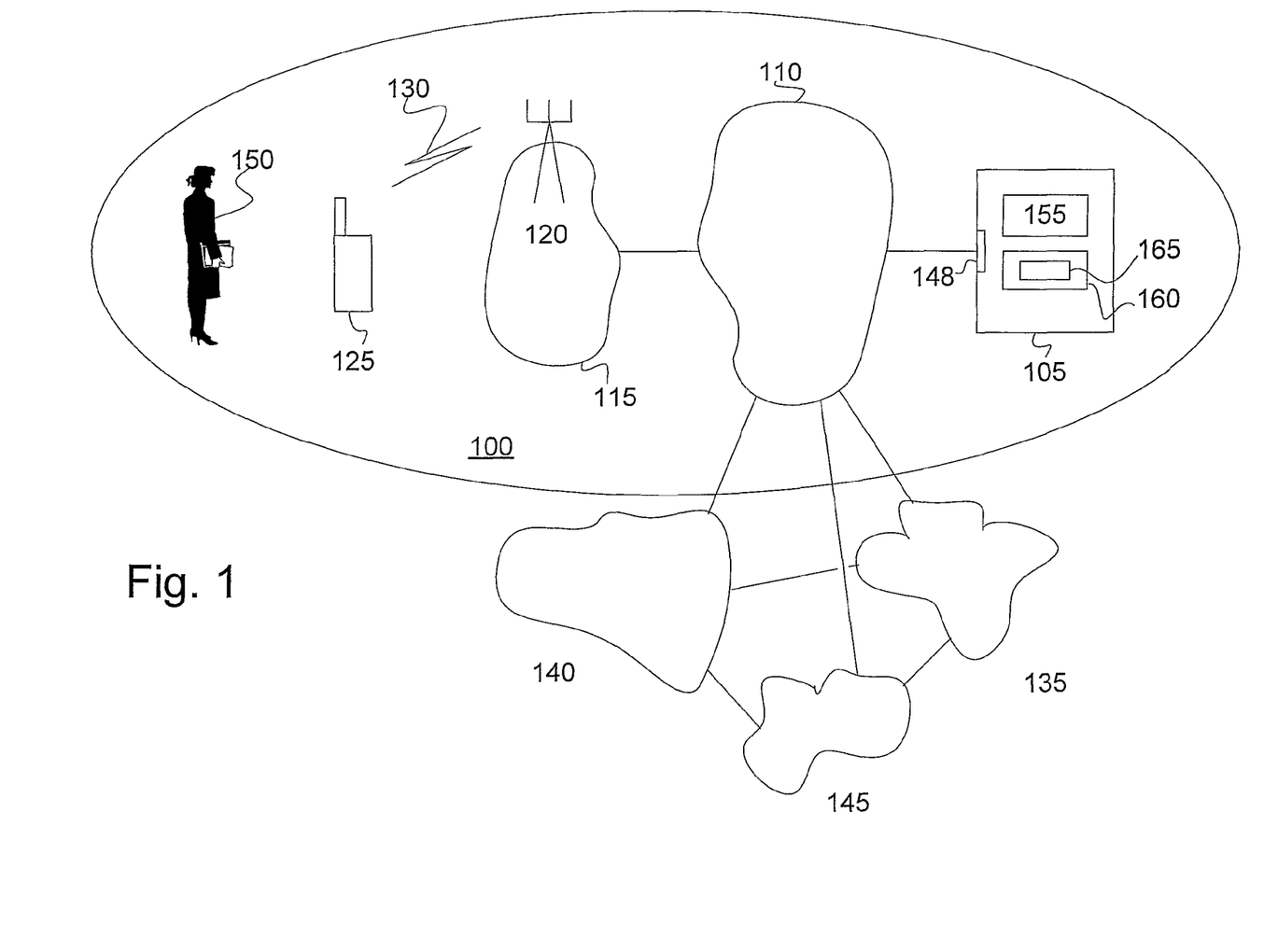
FIG. 1 is a schematic illustration of a mobile radio communications network providing PTT over cellular services.

The general architecture of a mobile radio network 100 providing a PTT service is schematically illustrated in FIG. 1. The mobile radio network 100 of FIG. 1 comprises a PTT server 105, a core network 110, an access network 115 and a radio base station 120. The PTT server 105 is connected to the core network 110, which is further connected to the access network 115. Access network 115 is connected to the radio base station 120, which provides communication with mobile stations 125 over a radio interface 130. Core network 110 could preferably be connected to other networks, such as the Internet 135, other mobile radio networks 140, and/or PSTN (Public Switched Telephone Network) networks 145. These other networks may or may not be interconnected. A mobile radio network 100 could comprise several PTT servers 105, although for the sake of simplicity, it will in the following be assumed that only one PTT server 105 is present. For purposes of illustration only, mobile stations 125 will in the following be referred to as PTT clients 125, notwithstanding the fact that most PTT clients 125 support many other communication services than the PTT service.

The PTT service provided by mobile radio network 100 is preferably administered by the PTT server 105, and the PTT server 105 advantageously comprises an interface 148 for communicating with PTT clients 125. A PTT client 125, communicating within mobile radio network 100 and being adapted to providing the PTT service to its user, can perform one way voice communication within a group of PTT clients 125 forming a PTT group. A PTT group can consist of two or more PTT clients 125, and the members of a PTT group may vary over time. Each PTT client 125 is associated with an identity. Within a PTT group, only one PTT client 125 can talk, i.e. send voice messages, at a time. When a PTT user 150 wants to send a voice message to one or several PTT clients 125, the PTT user 150 uses a terminal 125 to request a permission to send a PTT message. The PTT client 125 comprises software for sending a request for permission to send a PTT message. To request permission to send a PTT message is often referred to as requesting "the floor", and the request for permission to send a PTT message will hereinafter be referred to as a "floor request message". The sending of a "floor request message" from a PTT client 125 to the PTT server 105 could e.g. be initiated by the pressing of a predetermined button of PTT client 125. The PTT server 105 preferably comprises a mechanism 155 for granting permission to send a PTT message. The granting mechanism 155 preferably comprises software for sending a "floor granted" message to a PTT client 125 to which the floor should be granted. A PTT message comprises a representation of the sounds recorded during the time period that a PTT user 150 is occupying the floor.

The PTT server 105 could comprise a queuing mechanism, so that, if the floor is busy when the PTT server 105 receives floor request message, the identity of the PTT client 125 having sent the floor request message will be stored in a PTT queue. The PTT server 125 could then be adapted to administer one PTT queue for each PTT group that the PTT server 105 handles. A queuing mechanism of the PTT server 105 can advantageously be arranged so that whenever the floor is released, the PTT server 105 grants the floor to the PTT client 125 associated with the first identity in the PTT queue.

Alternatively, the PTT server 105 does not comprise a queuing mechanism, so that a floor request, received by the PTT server 105 from a PTT client 125, when the floor is occupied by another PTT client 125, will be ignored. In order to obtain the floor, a PTT client 125 may then have to send two or more floor request messages, until the floor is available when a floor request message reaches the PTT server 105.

When the floor is granted to a PTT client 125, a one-way communication line is opened to the PTT client 125. The one-way communication line is open until the floor is withdrawn from the PTT client 125. In a WCDMA network, e.g., the granting of the floor to a PTT client 125 typically involves the assignment of a Radio Access Bearer (RAB) to the PTT client 125. PTT server 105 preferably comprises a floor withdrawal mechanism 160, which controls the withdrawal of the floor from a PTT client 125. Floor withdrawal mechanism 160 can preferably comprise a timer 165, which is set when the floor is granted to a PTT client 125, so that when the timer lapses (typically after 20 or 30 seconds) the floor is withdrawn from the PTT client 125. The sound recorded by the microphone of the PTT client 125 during this period of time is part of the contents of a PTT message to be forwarded to other PTT clients 125 in mobile radio network 100 (although the PTT message could be divided into several different messages when transmitted between the PTT client 125 and the PTT server 105).

A "floor request" message sent from a PTT client 125 to the PTT server 105, as well as a "floor granted" message sent from the PTT server 105 to a PTT client 125, is advantageously transmitted using the Session Initiation Protocol (SIP) protocol, defined by the Internet Engineering Task Force, although any suitable protocol may be used. The interface 148 could support both the protocol(s) used for signalling communication between the PTT clients 125 and the PTT server 105 and the protocol used for the user plane communication between the PTT server 105 and the PTT clients 125. Alternatively, a separate interface 148 could be implemented for each protocol that can be used.

Mobile radio network 100 could operate according to any mobile radio communications standard which provides a PTT service: Mobile radio network 100 could e.g. be a GSM (Global System for Mobile Communication) network providing GPRS (General Packet data Radio Service) communication, a CDMA (Code Division Multiple Access) 2000 network or a WCDMA (Wideband CDMA) network. A PTT client 125 is typically a mobile station communicating within the mobile radio network 100, or could e.g. be a computer communicating with the PTT server 105 via the Internet 135.

Figure 2:
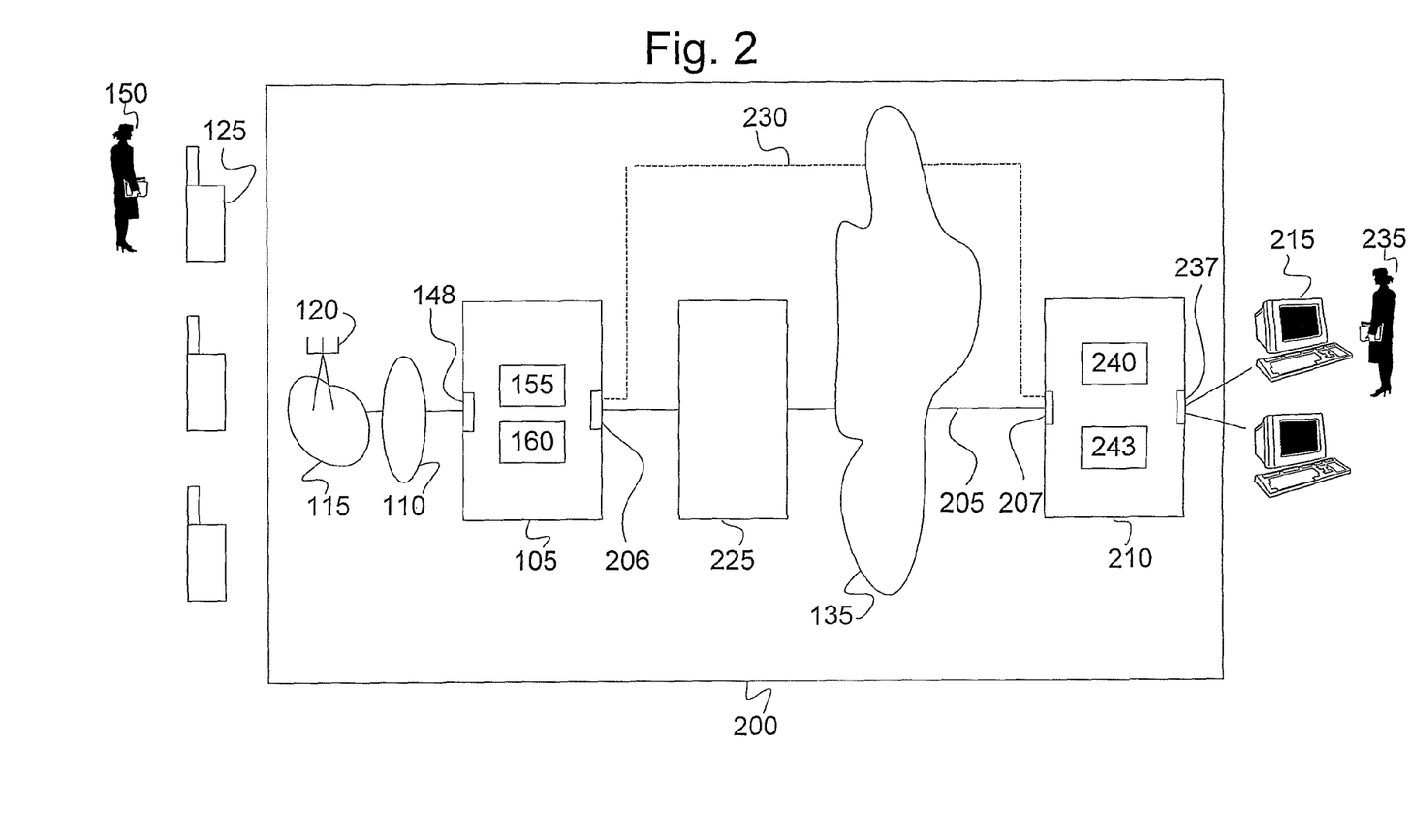
FIG. 2 is a schematic illustration of a communication system, in which a connection is provided between a PTT server and a chat server.

FIG. 2 schematically illustrates a communication system 200, in which a connection 205 is provided between a chat server 210 and a PTT server 105. The chat server 210 could e.g. be an Internet chat server, or a chat server connected to any other network. The communication between a PTT server 105 and the chat server 210 is preferably performed as packet data communication, and the connection 205 should not necessarily be seen as a fixed physical connection, but rather as a connection 205 comprising an interface 206 at the PTT server 105 and an interface 207 at the chat server 210, the interfaces 206 and 207 providing the PTT server 105 and the chat server 210, respectively, with the necessary mechanisms for communicating with a chat server 210 and a PTT server 105, respectively, over a communications network. Interface 206 could obviously use the same physical interface as interface 148, or a separate physical interface.

By providing a connection 205 between the chat server 210 and the PTT server 105, a PTT user 150 of a PTT client 125 could access a chat room provided by the chat server 210. At the same time, a chat room participant 235, using a chat client computer 215 to participate in a chat room provided by the chat server 210, could get access to PTT messages exchanged via the PTT server 105. A chat room in which PTT users 150 and chat room participants 235 can participate will in the following be referred to as an enlarged chat room. In the following, a message originating from a PTT client 125 will be referred to as a PTT message, even when transmitted in the chat format to a chat client 215. Likewise, a message originating from a chat client 235 will be referred to as a chat message, even when transmitted in the PTT format to a PTT client 125.

The connection 205 between the PTT server 105 and the chat server 210 could advantageously be realised by using an IP (Internet Protocol) network 220, such as the Internet 135, although any connection between the PTT server 105 and the chat server 210 may be used. In a preferred embodiment, messages transmitted over connection 205 are transmitted in accordance with the SIP (Session Initiation Protocol) protocol, although any suitable protocol may be used. If the chat messages sent from the chat clients 215 are text messages, a text/speech converter 225 could advantageously be used. The text/speech converter 225 should preferably be adapted to converting a speech message from PTT client 125 into a corresponding text message, which could be interpreted by chat client 215, as well as adapted to converting a text message from a chat client 215 into a message which could be interpreted as speech by PTT client 125. Preferably, the text/speech converter 225 is located between the PTT server 105 and the network 220, although the text/speech converter 225 may be located anywhere along the connection 205, or between the PTT server 105 and the PTT clients 125, or between the chat server 210 and the chat clients 215, or in the PTT server 105, or in the chat server 210. Moreover, the text-to-speech conversion of text/speech converter 225 could be located in one physical location, and the speech-to-text conversion of text/speech converter 225 could be located in a different physical location.

A control channel is advantageously established between the PTT server 105 and the chat server 210, by use of interfaces 206 and 207. The control channel could e.g. be used for exchanging information and instructions between the PTT server 105 and the chat server 210, as will be further discussed below. For purposes of illustration only, this control channel is illustrated in FIG. 2 as a control channel 230 separate to the connection 205 between the PTT server 105 and the chat server 210.

A PTT server 105 can advantageously be implemented by a general purpose computer, and the interface 206 can advantageously be implemented by use of an Ethernet interface implementing Ethernet layer 1 and layer 2 functionality. Alternatively, interface 206 can use other layer-2 technologies, such as the broadband wireless interfaces IEEE 802.16 or IEEE 802.11, or any other suitable communications protocol. Interface 206 can then support communication via several different higher layer protocols, such as the Internet protocol (IP), the transmission control protocol (TCP), user datagram protocol (UDP) and session initiation protocol (SIP). Likewise, chat server 210 can also advantageously be implemented by use of a general purpose computer, and interface 207 can also advantageously be implemented by use of Ethernet, IEEE 802.16 or IEEE 802.11.

A chat server 210 provides access to at least one so called chat room to participants 235 of the chat room via interface 237. Interface 237 comprises software for sending and receiving messages from chat clients 237. Each chat room participant 235 is typically associated with an identity, which can be stored in the chat server 210, or sent to the chat server 210 in a chat message. A chat server 210 preferably comprises a queuing mechanism for placing incoming chat messages in a chat message queue 240. The chat server 210 normally operates in a Head of Line (HOL) mode, so that the chat messages in the chat message queue 240 are distributed to the chat room participants 235 in the order in which the chat messages were received by the chat server 210.

Hence, a chat room participant 235 may submit a chat message to the chat room at any time, but the chat message may be placed in a chat message queue 240 before it is distributed to the other chat room participants 235. A PTT user 150 on the other hand, may only submit a PTT message to the PTT group when he/she has the floor. However, any PTT messages submitted by the PTT user presently occupying the floor will appear in (quasi) real time at the PTT clients 125 to which the PTT messages were addressed.

The transmission of chat messages by the chat server 210 and the transmission of PTT messages by the PTT server is harmonised. Hence, the transmission of PTT messages from a PTT server 105 operating in a floor granting mode, in which the PTT server 105 only receives PTT messages from the PTT client 125 having the floor, is harmonised with the transmission of chat messages from an chat server 210 operating in a head of line mode.

The harmonisation of the transmission of messages from the PTT server 105 and the chat server 210 can be solved by providing the chat server 210 with storage 243 for a PTT identity, and hence with the possibility of requesting the floor. When the chat server 210 occupies the floor, the chat server 210 will send chat messages received from chat room participants 235 not only to other chat room participants 235, but also to the PTT server 105. The PTT server 105 will then transmit chat messages, received from the chat server 210, to PTT clients 125 participating in the enlarged chat room. When the chat server 210 occupies the floor, the floor cannot be granted to any PTT clients 125, and no PTT messages can be transmitted. Any requests from PTT users 150 to receive the floor while the chat server 210 occupies the floor will be ignored, or if the PTT server 105 employs a PTT queue, stored and retained in the PTT queue.

On the other hand, when the chat server 210 does not occupy the floor, no chat messages can be transmitted to PTT users 150. This causes a delay in the transmission of any chat messages to PTT users 150. When a PTT client 125 occupies the floor, a PTT message sent by the corresponding PTT user 150 will, be transmitted by PTT server 105 to chat server 210, as well as to other PTT clients 125. Hence, the chat server 210 will receive any chat messages and PTT messages sent. However, the chat server 210 can only forward messages to chat clients 215, and not to the PTT server 105. Hence, four different implementations of how to handle messages received by the chat server 210 when the chat server 210 does not occupy the floor can be identified:

i) both chat messages and PTT messages received by the chat server 210 are forwarded to chat clients 215. In this implementation, there will be a delay in the delivery of chat messages to PTT users 150. Furthermore, there will be a discrepancy between the messages received by a PTT user 150, who will only receive PTT messages when the chat server 210 does not occupy the floor, and the messages received by a chat room participant 235, who will receive both PTT messages and chat messages (any chat messages received by the chat server 120 while the chat server does not occupy the floor will be delivered to the PTT users 150 when the floor is granted to the chat server 210).

ii) chat messages received by the chat server 210 are retained in the chat message queue 240, whereas PTT messages received by the chat server 210 are forwarded by the chat server 210 to chat room participants 235. In this implementation, there will be no discrepancy in the messages received by the PTT users 150 and the chat room participants 235: both will receive PTT messages when the chat server 120 does not occupy the floor, but no chat messages. However, there will be a delay in the delivery of chat messages to both PTT users 150 and chat room participants 235.

iii) neither chat messages nor PTT messages received by the chat server 210 are forwarded to chat clients 215, but are retained in chat messages queue 240. In this implementation, there will be a delay in the delivery of chat messages to both PTT users 150 and to chat room participants 235, as well as a delay in the delivery of PTT messages to chat room participants 235. Furthermore, there will be a discrepancy between the messages received by a chat room participant 235, who will receive no messages, and the messages received by the PTT users 150, who will receive PTT messages.

iv) chat messages received by the chat server 210 are forwarded to chat clients 215, whereas PTT messages are retained in a queue. In this implementation, the PTT users 150 will receive PTT messages only when the chat server 210 does not occupy the floor, and the chat room participants will receive chat messages only. Hence, there will be a delay in the delivery of PTT messages to chat room participants, and a delay in the delivery of chat messages to PTT users.

An entry relating to a chat message in chat message queue 240 could advantageously have an indication indicating whether the chat message has been delivered to the relevant chat clients 215 or not. Alternatively, a separate queue for chat messages that have been delivered to chat clients, but not to PTT server 105, could be used. A chat message should not be discarded by chat server 210 until it has been delivered both to chat clients 215 and to the PTT server 105.

The operation modes of the PTT server 105 and the chat server 210 are illustrated in Table 1.

the floor, the floor is granted to the chat server 210. The indication could e.g. be a flag, or a queue for storing chat server identities. In a communication system 200 comprising more than one chat server 210 capable of communicating with a PTT server 105, a queue could advantageously be used.

In the embodiment in which the chat server 210 is given priority over the PTT clients 125, the chat server 210 could advantageously wait until N chat messages that have not yet been delivered to the PTT server 105 is accumulated in the chat message queue 240, before the "floor request" message is sent. Depending on the ratio between the number of chat room participants 235 and the number of PTT users 150, N should typically be set to a value less than 10. In order to make sure that a chat message will not have to wait too long until being delivered to the PTT server 105, a timer could advantageously be set upon reception of a first chat message is after the floor has been withdrawn from the chat server 210. If the timer expires before N messages is accumulated in the chat

TABLE 1

The operation mode of the PTT server 105 and the chat server 210 when the floor is granted to the chat server 210 and to a PTT client 125, respectively.

| | Operation mode of PTT server 105 | Operation mode of chat server 210 |
|---|---|---|
| Floor granted to chat server 210 | No PTT messages received. Chat messages transmitted to PTT clients 125. | Chat messages transmitted to chat clients 215 and to PTT server 105 in accordance with chat message queue 240. No PTT messages received. |
| Floor granted to PTT client 125 | PTT messages transmitted to PTT clients 125 and to chat server 210. No chat messages received. | Chat messages either retained in chat message queue 240, or transmitted to chat clients 215. PTT messages either retained in chat message queue 240 (or a separate queue), or transmitted to chat clients 215 |

Since the PTT identity of the chat server 210, stored in storage 243, represents many chat room participants 235, the PTT identity of the chat server 210 should preferably be treated differently by the PTT server 105 than the PTT identities representing a single PTT user 150. If the PTT identity of the chat server 210 were to be treated in the same way as a PTT identity of a PTT client 125, then the chat room participants 235 would always have less access to the enlarged chat room than the PTT users 150 (unless there is only one chat room participant in the enlarged chat room, in which case the access to the enlarged chat room would be equal among all the participants in the enlarged chat room).

In one embodiment of the granting mechanism 155, a "floor request" message received from the chat server 210 will in the PTT server be given priority over "floor request" messages received from PTT clients 125. In a PTT server 105 having a queuing mechanism, the identity of the chat server 210 could be placed at the top of the PTT queue immediately upon reception, so that the floor would be granted to the chat server 210 as soon as it becomes available. In a PTT server 105 with no queuing mechanism for PTT clients 125 having requested the floor, an indication as to the fact that the chat server 210 has requested the floor can be made upon reception of a "floor request" message from the chat server 210. This indication is preferably checked when the floor is released. If the indication indicates that the chat server 210 has requested message queue 240, a "floor request" message will be sent to the PTT server 105 upon the expiry of the timer.

In another embodiment, the chat server 210 comprises software for requesting the floor from the PTT server 105 as soon as the chat server 210 receives a first message to be transmitted. In this embodiment, the PTT server 105 preferably gives no priority to the chat server 210, and the chat server 210 may have to send repeated "floor request" messages until the floor is acquired. If the PTT server 105 has a PTT queue for clients 125 having requested the floor, the PTT server 105 in this embodiment comprises software for adding the PTT identity of the chat server 210 to the PTT queue, and for granting the floor to the chat server 210 when the PTT identity of the chat server 210 is the first identity in the PTT queue.

In a communication system 200 comprising a PTT server 105 and a chat server 210 having a PTT identity, the floor withdrawal mechanism 160 should preferably be arranged to be able to distinguish between the case when the floor has been granted to the chat server 210 and case when the floor has been granted to a PTT client 125.

Figure 3A:
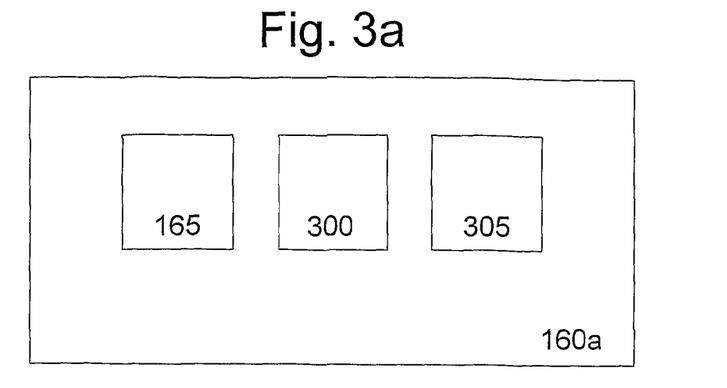
FIG. 3a illustrates an embodiment of a withdrawal mechanism for determining when to withdraw the floor from a chat server occupying the floor.
Figure 3B:
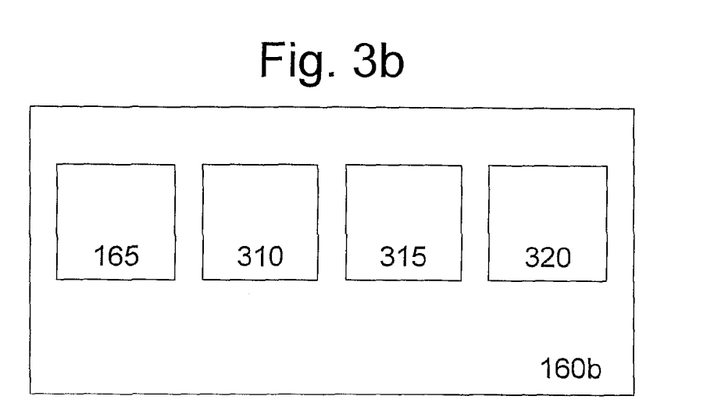
FIG. 3b illustrates another embodiment of a withdrawal mechanism for determining when to withdraw the floor from a chat server occupying the floor.

FIG. 3 illustrates two implementations of floor withdrawal mechanism 160 which are adapted to determining when the floor should be withdrawn from the chat server 210. In FIG. 3a, the floor withdrawal mechanism 160a is shown to comprise a timer 300. The timer 300 could be set to a time period T upon granting the floor to the chat server 210, the time period T preferably being longer than the time period to which the timer 165, associated with the granting of the floor to a PTT client 125, is set. When the timer 300 expires, the floor could be withdrawn from the chat server 210 (if a chat message is presently being transmitted to PTT clients 125 when the timer 300 expires, the floor should preferably not be removed from the chat server 210 until the transmission of the chat message has been completed). However, if no "floor request" message has been received from a PTT client 125 during the time period T, it may seem unnecessary to withdraw the floor from the chat server 210 even if the timer has expired. Floor withdrawal mechanism 160a of FIG. 3a therefore further comprises an indication 305, the indication 305 indicating whether a "floor request" message has been received or not during the time period T. If the floor has not been withdrawn from the chat server 210 upon expiry of the timer, the floor should preferably be withdrawn as soon as the PTT server 210 receives a "floor request" message after the expiry of the timer. The indication 305 should preferably be set to a value indicating that a "floor request" message has been received by a PTT client 215 during the time period T upon reception of the first "floor request" message received after the timer 300 has been set.

FIG. 3b illustrates another implementation of the floor withdrawal mechanism 160 adapted to determining when the floor should be withdrawn from the chat server 210. In floor withdrawal mechanism 160b of FIG. 3b, the floor withdrawal mechanism 160b comprises a counter 310, the counter 310 being arranged to count how many chat messages have been transmitted by the chat server 210 to the PTT server 105: When the number of chat messages transmitted by chat server 210 exceeds a pre-determined number, M, the chat server 210 should no longer occupy the floor. However, in order to make sure that PTT users 150 are not waiting to receive the floor without there being any chat messages to deliver by the chat server 210 occupying the floor, the floor withdrawal mechanism 160b of FIG. 3b comprises a timer 315, as well as a counter 310, the timer 315 being set upon the reception of a "floor request" message from a PTT client 125 after the floor has been granted to the chat server 210. If the timer 315 expires before the counter 310 has reached the pre-determined number M, the floor will be withdrawn from the chat server 210 upon expiry of the timer 315. The floor withdrawal mechanism 160b of FIG. 3b could furthermore comprise a mechanism 320 for checking, upon the counter 310 reaching its predetermined value M, whether the timer 315 has been set, but not yet expired. If the timer 315 has not been set, the floor withdrawal mechanism 160b could be implemented to not withdraw the floor from chat server 210 until a "floor request" message has been received by the PTT server 210.

The part of floor withdrawal mechanism 160 relating the withdrawal of the floor from the chat server 210 should preferably be implemented in the PTT server 105, in which case the PTT server 105 will remove the floor from the chat server 210, although the part of the floor withdrawal mechanism 160 which relates to the withdrawal of the floor from the chat server 210 could alternatively be implemented in the chat server 210, in which case the chat server 210 returns the floor to the PTT server 105.

Figure 4:
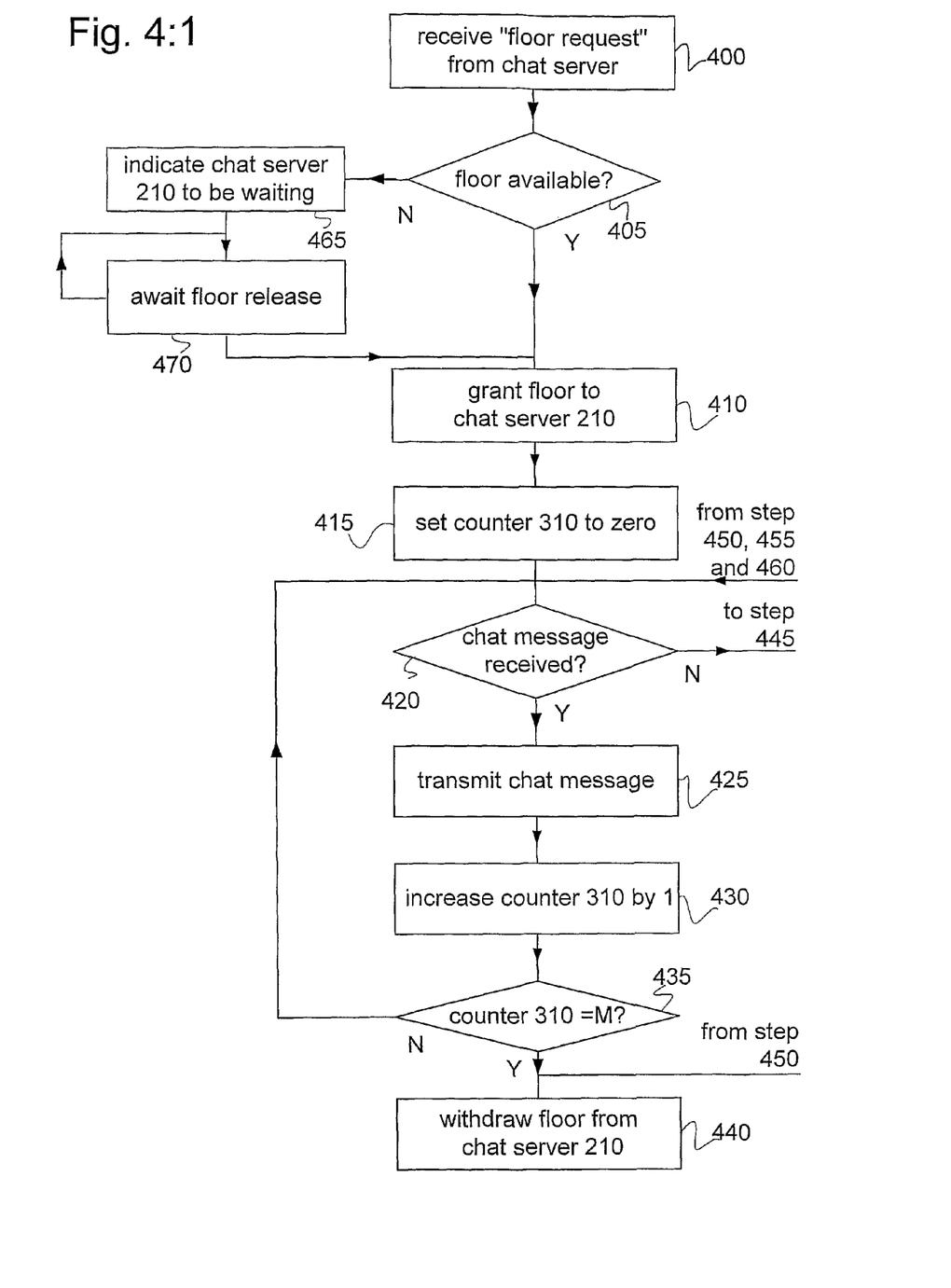
FIG. 4 is a flowchart illustrating a scenario in a PTT server.

FIG. 4 is a flowchart illustrating a scenario in a PTT server 105, in an embodiment in which "floor request" messages from the chat server 210 are given priority over "floor request" messages from PTT clients 125, and the floor withdrawal mechanism 160 comprises a counter 310 and a timer 315, as in the embodiment 160b illustrated in FIG. 3b. In step 400 of FIG. 4, the PTT server 105 receives a "floor request" message from the chat server 210. In step 405, it is checked whether the floor is available. If so, step 410 is entered, in which the floor is granted to chat server 210. Step 415 is then entered, in which counter 310 is set to zero. Step 420 is then entered, in which it is checked whether any chat message has been received from chat server 210. If so, step 425 is entered, in which the chat message is transmitted to PTT clients 125. Step 430 is then entered, in which the counter 310 is increased by 1. Next, step 435 is entered, in which it is checked whether the counter has reached the pre-determined number M. If not, step 420 is re-entered. However, if the counter 310 has reached the pre-determined number M, step 440 is entered, in which the floor is withdrawn from the chat server 210.

If it is found in step 420 that no chat message has been received, step 445 is entered, in which it is checked whether the timer 315 has been set. If so, step 450 is entered, in which it is checked whether the timer 315 has expired. If the timer 315 has expired, step 440 is entered. However, if the check of step 450 shows that the timer has not yet expired, step 420 is re-entered.

If it is found in the check of step 445 that the timer 315 is not set, step 455 is entered, in which it is checked whether a "floor request" message has been received from any PTT client 125. If so, step 460 is entered, in which the timer 315 is set. However, if the check in step 455 shows that no "floor request" message has been received, step 430 is re-entered.

If it is found in step 405 that the floor is not available upon reception of a "floor request" message from chat server 210, then step 465 is entered, in which it is indicated that the chat server 210 has requested the floor. Step 470 is then entered, in which floor release is awaited. When the floor is released, step 410 is entered.

As discussed above in relation to FIG. 3b, the withdrawal mechanism 160b does not necessarily include a timer 315. If the withdrawal mechanism 160b does not include a timer 315, the steps 445-460 could be omitted from the flowchart of FIG. 4. Furthermore, when the withdrawal mechanism 160b comprises a mechanism 320 for checking whether the timer 315 has been set in order to ensure that the floor is not unnecessarily withdrawn from the chat server 210, a step in which it is checked whether the timer 315 has been set would be included in the flowchart of FIG. 4, after step 435 but before step 440. Moreover, in an embodiment in which the withdrawal mechanism 160 comprises a timer 300 instead of a counter 310 (see floor withdrawal mechanism 160a of FIG. 3a), step 415 would be replaced by a step in which timer 300 is set. Steps 445-460 would then be replaced by a step in which it is checked whether the timer 300 has expired. If it was found that the timer 300 had expired, step 440 would be entered, whereas step 420 would be re-entered if it was found that the timer 300 had not expired. Steps 430 and 435 would be omitted in an embodiment comprising a timer 300 rather than a counter 310.

The value of M, representing the number of chat messages received from the chat server 210 before the floor is withdrawn from the chat server 210, could take any number, including 1. Typically, the value of M could be a value between 4 and 8. Furthermore, the value of M could be dynamic and vary as the ratio of the number of chat messages sent and the number of PTT messages sent varies. Correspondingly, in an example implementation in which the withdrawal mechanism 160 comprises a timer 300 instead of a counter 310, the time period T to which the timer 300 is set could also be dynamic. A typical time period to which the timer 315 could be set is 3 minutes.

Figure 5:
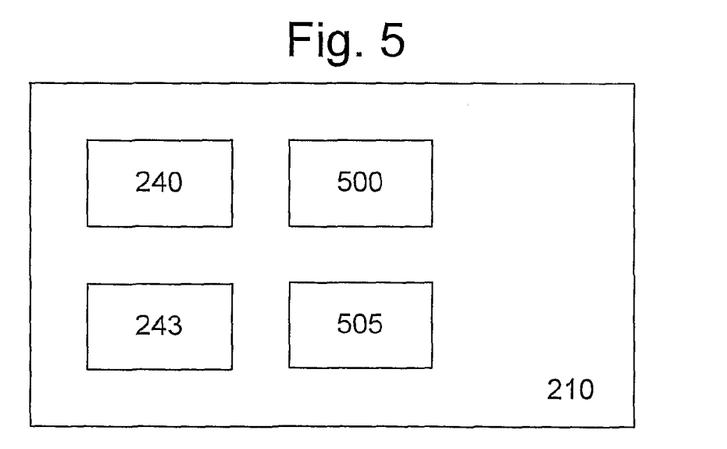
FIG. 5 is an embodiment of a chat server.

FIG. 5 schematically illustrates an embodiment of the chat server 210 comprising a counter 500 for counting how many chat messages that have been received since the floor was withdrawn from chat server 210. Chat server 210 of FIG. 5 further comprises a timer 505 that can be set upon reception of the first chat message received after the floor has been withdrawn, in order to ensure that no chat message will have to wait longer than the timer period to which the timer 505 is set before being delivered to PTT clients 125. Chat server 210 of FIG. 5 furthermore has an identity 243, and comprises a chat message queue 240.

Figure 6:
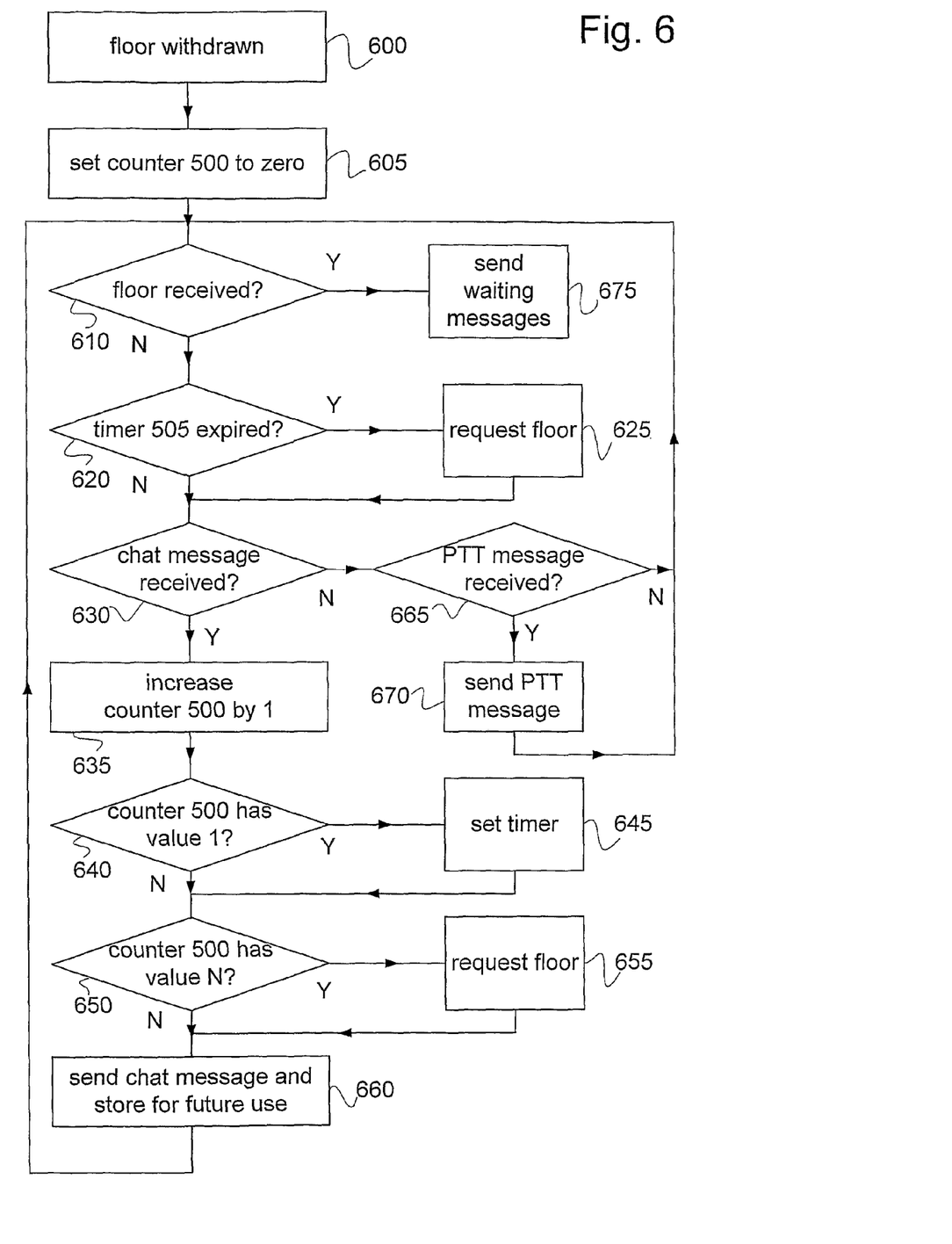
FIG. 6 is a flowchart illustrating a scenario in the chat server of FIG. 5.

FIG. 6 is a flowchart illustrating a scenario in the embodiment of the chat server 210 illustrated in FIG. 5. In step 600, the floor is withdrawn from chat server 210. Step 605 is then entered, in which counter 500 is set to zero. In step 610, it is checked whether floor has been received by chat server 210. If floor has not been received, step 620 is entered, in which it is checked whether timer 505 has expired. If timer 505 has expired, step 625 is entered, in which a "floor request" message is sent to PTT server 105. If, however, the check performed in step 620 shows that timer 505 has not expired, step 630 is entered, where it is checked whether a chat message has been received from a chat client 215. If a chat message has been received, then step 635 is entered, in which the counter 500 is increased by 1. Step 640 is then entered, where it is checked if the counter 500 has the value 1. If so, step 645 is entered, in which the timer 505 is set. Step 650 is then entered. If, however, the check performed in step 640 shows that the value of the counter 500 differs from 1, then step 650 is entered directly. In step 650, it is checked whether the counter 500 has the pre-determined value N. If so, step 655 is entered, in which the floor is requested. Step 660 is then entered. If it is found in step 650 that the value of the counter 500 is not the pre-determined value N, then step 660 is entered directly. In step 660, the received chat message is sent to the relevant chat clients 215, and stored for future delivery to PTT clients 125. Step 610 is then re-entered.

If it is found in step 630 that no chat message has been received, then step 665 is entered, in which it is checked whether a PTT message has been received from PTT server 105. If so, step 670 is entered, in which the PTT message is delivered to the relevant chat clients 215. Step 610 is then re-entered. If it is found in step 665 that no PTT message has been received, then step 610 is re-entered directly.

If it is found in step 610 that the floor has been received, step 675 is entered, in which any waiting chat messages are sent to PTT server 105 for further delivery to PTT clients 125.

The checks performed in steps 630 and 665 could advantageously include checking the chat message queue 240 for any chat messages or PTT messages received, respectively. Step 660 could include storing a chat messages sent to chat clients 215 in a separate queue for messages that are to be sent to PTT server 105 as soon as chat server 210 receives the floor. In this embodiment, step 675 would include sending the messages stored in this separate queue. Alternatively, step 660 could include keeping the chat message, which has been sent to chat clients 215, in the chat message queue 240, and indicating in the chat message queue 240 that the chat message has been sent to chat clients 215, but is waiting to be sent to PTT clients 125. The indicating could e.g. be performed as setting a flag in relation to the relevant entry in chat message queue 240 to the value "sent to chat clients 215". In this embodiment, step 675 would include sending the messages in chat message queue 240 which have been indicated as waiting to be sent to PTT clients 125.

In order for the chat server 210 to distinguish between a chat message and a PTT message, a messages could e.g. comprise a data field comprising information regarding the origin of the message, and the chat server 210 could comprise a mechanism for determining, by analysing the contents of this data field, whether a message originates from a PTT client 125 or from a chat client 215.

Step 610 of checking whether the chat server 210 has the floor or not could e.g. be implemented by use of a floor granting flag, which could be set to a value representing a "floor granted" state when a floor granted message is received from the PTT server 105, and set to a value representing a "floor not granted" state when the floor is being withdrawn from the chat server 210.

The method illustrated by the flowchart in FIG. 6 could be altered in many ways. If no timer 505 is implemented in chat server 210, then steps 620, 625, 640 and 645 could obviously be omitted. As discussed in relation to table 1, any PTT messages and/or chat messages received while chat server 210 does not occupy the floor could be retained to be sent when the chat server 210 has acquired the floor. Steps 660 and 670 could then be omitted/altered. The value of N could be set to any number, including 1. In one example implementation, the value of N could be dynamic and change as the ratio of the number of chat messages and the number of PTT messages sent varies. The value of N should advantageously be smaller or equal to the value of the pre-determined number M, discussed in relation to FIG. 4.

The pre-determined value N of the counter 500 together with the pre-determined number M of counter 310 (or, alternatively the pre-determined time period T of timer 300), obviously affect the relationship between the access time to the enlarged chat room experienced by the PTT users 150 and the access time experienced by the chat room participants 235. If the number of active PTT users 150 is small compared to the number of active chat room participants, then N (T) should have a larger value, and vice versa. Similarly, the pre-determined number M should advantageously be small when the number of chat messages sent is large compared to the number of PTT messages sent. As mentioned above, the value N (T) and/or the value of M could be dynamic, in order to cater for situations where the ratio between active PTT users 150 and chat room participants 235 vary over time. A counter for counting the number of floor requests from PTT clients 125 (or the number of PTT messages received by the PTT server 105), could then be used, in addition to the counter 310 counting the number of chat messages received by the PTT server 105 (alternatively, a separate counter could be used for counting the number of chat messages received). By calculating the ratio of the number of PTT messages and the number of chat messages received by PTT server 105, a suitable value N (time period T) and/or M could be obtained.

Figure 7:
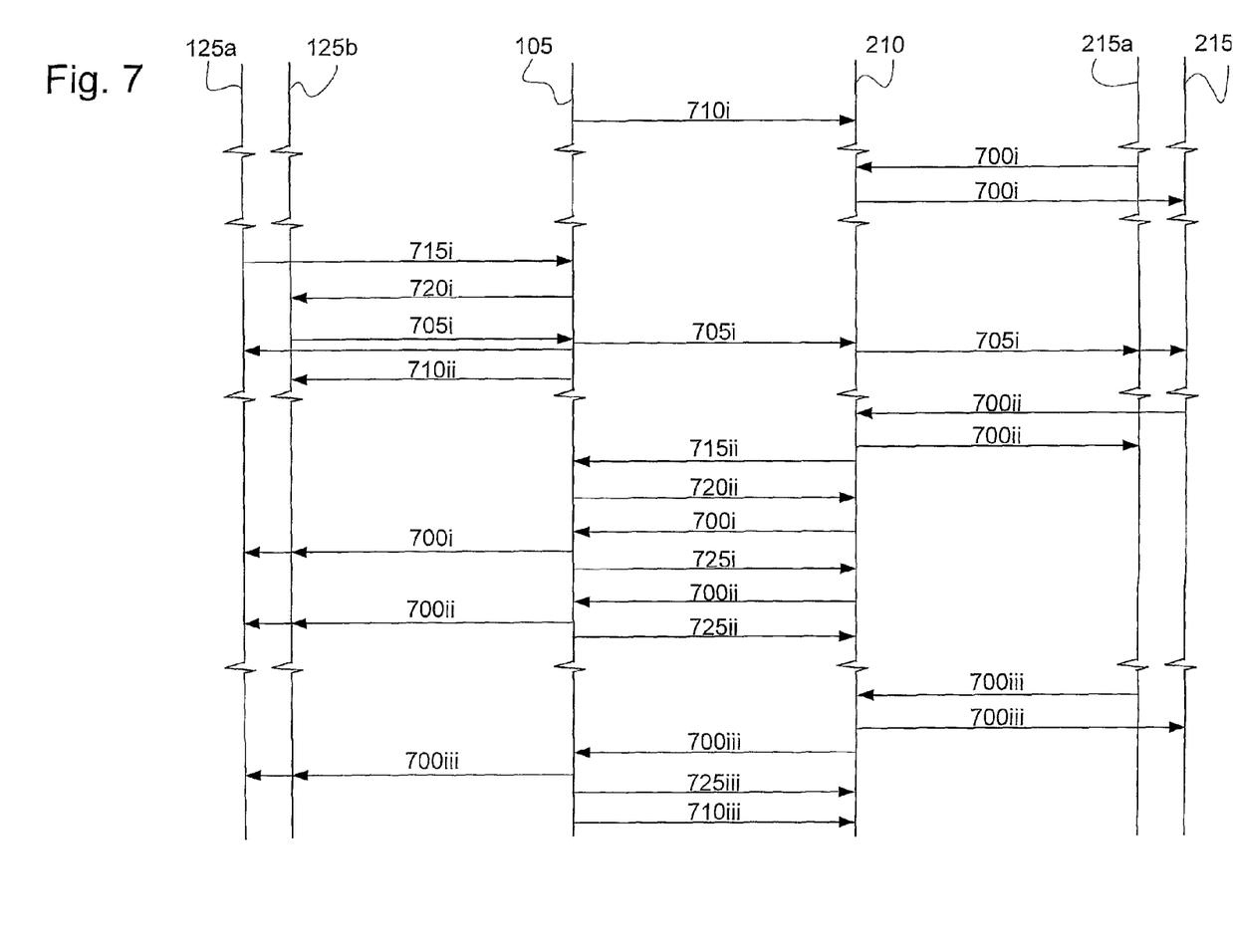
FIG. 7 is a sequence diagram illustrating a scenario in the communication system of FIG. 2.

FIG. 7 is a sequence diagram illustrating the flow of messages between PTT clients 125, a PTT server 105, a chat server 210, and chat clients 215 in a possible scenario, given by way of example only, in an enlarged chat room. For purposes of illustration only, two PTT clients 125a and 125b, as well as two chat clients 215a and 215b, are illustrated in FIG. 7. Obviously, any number of PTT clients 125 and chat clients 215 may take part in an enlarged chat room. The lines of FIG. 7 indicating the nodes are broken between unrelated events. The text/speech converter 225 is not included in the Figure, but would advantageously be located between the PTT server 105 and the chat server 210.

The sequence diagram of FIG. 7 illustrates an embodiment in which the chat server 210 requests the floor from the PTT server 105 after having received two chat messages 700 (i.e. the pre-determined number N equals 2). Moreover, in the embodiment illustrated by FIG. 7, the chat server forwards any received PTT messages 705 and any received chat messages 700 to the relevant chat clients 215 upon reception (i.e.

the implementation i), as discussed in relation to table 1, is implemented). Furthermore, by way of example, the PTT server 105 of FIG. 7 removes the floor from the chat server 210 when three chat messages 700 have been received by the PTT server 105, i.e. the pre-determined number M equals 3. In FIG. 7, four different types of control messages are exchanged between the chat server 210 and the PTT server 105 over the control channel 230: the "floor request" 715, "floor granted" 720, "floor withdrawn" 710 and "chat message acknowledgement" 725. As can be seen from the above, these control messages all relate to the sending of chat messages 700 to PTT clients 125. Obviously, the interfaces 206 and 207 could support the exchange of other types of control messages over the control channel 230.

In the scenario illustrated by FIG. 7, the floor is initially withdrawn from the chat server 210 by the PTT server 105 sending a "floor withdrawn" message 710 to the chat server 210. The chat server 210 then receives a first chat message 700i from chat client 215a, which the chat server 210 forwards to chat client 215b. The first chat message 700i is then saved for future delivery to PTT server 105 (cf. step 660 of FIG. 6).

A "floor request" message 715 is sent from PTT client 125a to the PTT server 105, and a "floor granted" message 720i is then sent from PTT server 105 to PTT client 125a. The PTT client 125a is then sends a PTT message 705i to the PTT server 105, which forwards the PTT message 705i to the PTT client 125b, as well as to the chat server 210. The chat server 210 then forwards the PTT message 705i to the chat clients 215a and 215b. A "floor withdrawal" message 710ii is sent from the PTT server 105 to the PTT client 125b when it is time to withdraw the floor from the PTT client 125b, e.g. upon expiry of the timer 165.

A second chat message 700ii is then received by the chat server 210 from the chat client 125b. The chat server 210 forwards the chat message 700ii to the chat client 125a, and saves the chat message 700ii for future delivery to the PTT server 105. The counter 500 (cf. FIGS. 6 and 6) has then reached the pre-determined number N, which is set to 2, and a floor request message 715ii is sent by the chat server 210 to the PTT server 105. The PTT server 105 then sends a "floor granted" message 720ii the chat server 210. Upon reception of the "floor granted" message 720ii, the chat server forwards the chat messages 700i and 700ii, saved for future delivery to the PTT server 105, to the PTT server 105, which forwards the chat messages 700i and 700ii to the PTT clients 125a and 125b. In the implementation illustrated by FIG. 7, the chat server 210 first sends the chat message 700i to the PTT server 105, and awaits a "chat message acknowledgement" message 725i before the second chat message 700ii is sent. However, other implementations could work equally well.

When a third chat message 700iii is received by the chat server 210 from chat client 215a, the third chat message 700iii is forwarded to both the chat client 215b and the PTT server 105. PTT server 105 forwards the chat message 700iii to the PTT terminals 125a and 125b. The counter 310 of PTT server 105 has now reached its pre-determined value M, which is set to three, and hence, a "floor withdrawal" message 710iii is sent from the PTT server 105 to the chat server 210.

Needless to say, the sequence diagram of FIG. 7 could go on indefinitely, illustrating a scenario comprising unrelated and related events.

When the chat server 210 or a PTT client 125 has received a floor granted message 720, from the PTT server 105, the chat server 210/PTT client 125 could advantageously send a "floor acknowledge" message to the PTT server 105. In FIG. 7, the "floor request" messages 715ii from the chat server 210 and the "floor request" message 715i from a PTT client 125 have been illustrated as being of the same message type. However, the "floor request" message 715ii from the chat server 210 and the "floor request" message 715i from a PTT client 125 may be of the different message type. Likewise, the "floor granted" message 720 ii to the chat server 210 and the "floor granted" message 720i to a PTT client 125 may be of different message types, although illustrated to be of the same message type in FIG. 7. The floor withdrawn message 710ii sent to PTT client 125b when the floor is withdrawn from the PTT client 125b could be omitted if a timer, corresponding to the timer 165, is set in the assuming that a timer set in a PTT client 125 when the floor is granted to the PTT client 125b. Further signalling messages to be used in the signalling between a PTT server 105 and a chat server 210 could also be defined, such as e.g. a "floor voluntarily returned" message that could be sent from the chat server 210 to the PTT server 105 when the chat server 210 has no more chat messages to transfer and the floor has not yet been withdrawn, or messages that would allow the PTT server 105 to manipulate state variables associated with the chat server 105, such as e.g. an "increase/decrease counter 500" message, or "increase/decrease counter 500" message.

Figure 8A:
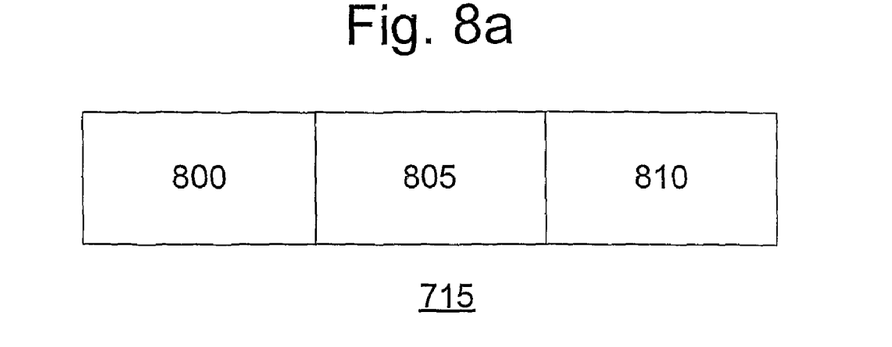
FIG. 8a is an example of a floor request message sent from a chat server to a PTT server.
Figure 8B:
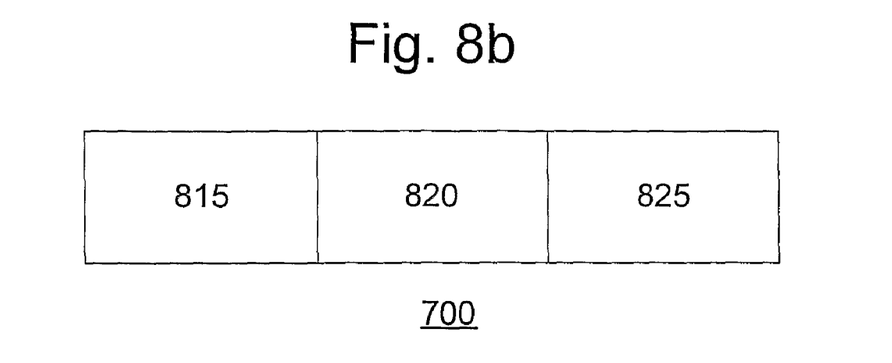
FIG. 8b is an example of a chat message sent from a chat server to a PTT server.
Figure 8C:
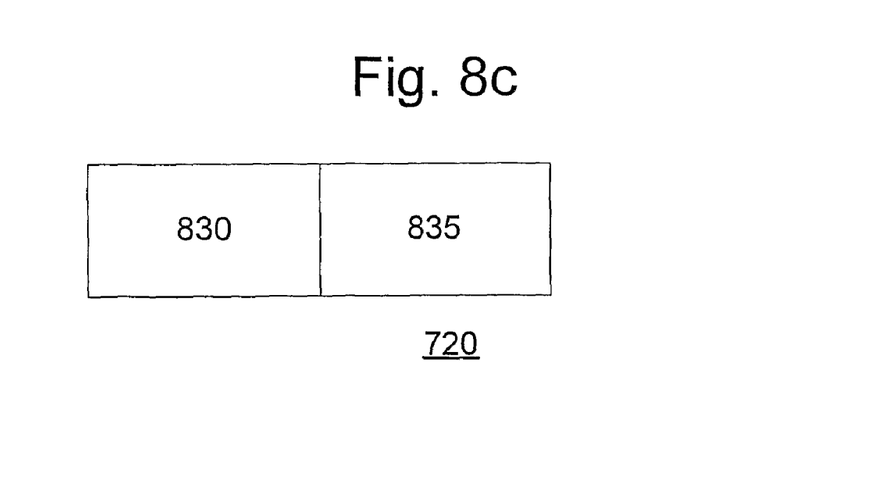
FIG. 8c is an example of a floor granted message sent from a PTT server to a chat server.

An example of a floor request message 715 is illustrated in FIG. 8a. A "floor request" message 715 preferably comprises an address field 800 comprising the address of the PTT server 105 to which the message 715 is sent, a request field 805 comprising an indication of the floor request, and a chat server identification field 810, preferably comprising the PTT identity of the chat server 210, stored in storage 243 of chat server 210. An example of a chat message 700 is illustrated in FIG. 8b. The chat message 700 of FIG. 8b comprises an address field 815 comprising the address of the PTT server 105 to which the chat message 700 is forwarded, a chat server identification field 820, a sender identification field identifying the chat room participant 235 from which the message 700 originates, and the message body field 825. A PTT message 705 could be of similar format. In FIG. 8c an example of a "floor granted" message 720 is illustrated, the "floor granted" message 720 of FIG. 8c comprising an address field 830 comprising the address of a chat server 720 to which the floor is granted, and a floor granted field 835 comprising an indication of the floor being granted. A "floor withdrawn" message 710 could be of similar format, with the floor granted field 835 replaced by a floor granted field. Obviously, the messages illustrated in FIG. 8a-c are examples only, and the messages 715, 700, 705, 710 and 720 and 710 could obviously comprise any suitable data field, arranged in any order according to the requirements of the protocol used.

When PTT messages 705 sent by a PTT user 150 and transmitted to chat clients 215 have to be converted into text messages, the PTT user 150 could advantageously be associated with a chat room identity, which could be presented to the chat room participants 235 upon reception of a PTT message 705 in order for chat room participants 235 to distinguish between different PTT users 150. Such an identity could e.g. be stored in the PTT client 125, and added to each PTT message 705 transmitted by the PTT client 125 in a chat identity field of the PTT message 705. Alternatively, the chat room identity could be stored in the PTT server 105, or the text/speech converter 225, which could add the chat room identity to any PTT message 705 originating from the PTT client 125 being sent to the chat server 210. Similarly, in the case when chat messages 700 sent by chat room participants 235 and transmitted to PTT clients 125 have to be converted from text to speech, different text to speech conversion algorithms could be associated with different chat room participants 235, in order to enable for the PTT users 150 to distinguish between different chat room participants 235. An indication of which text to speech algorithm should be used could e.g. be inserted in a data field of the chat message 700. Alternatively, the chat server 210, or the text/speech converter 225, could have a mechanism for associating a chat room participant 235 with the same text to speech conversion algorithm each time a chat message 700 from the same chat room participant 235 is to be converted.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

The invention claimed is:

1. A push to talk server for forwarding push to talk messages in a mobile radio network, the server comprising an interface for receiving, from push to talk clients, requests to send push to talk messages; an interface for receiving push to talk messages to be forwarded; an interface for transmitting push to talk messages to push to talk clients; an interface adapted to receive messages to be transmitted to push to talk clients from another server; an interface adapted to transmit push to talk messages, received from push to talk clients, to said another server; and a granting mechanism for granting, to one push to talk client at a time within a push to talk group, permission to send push to talk messages, the push to talk server comprising:
an interface adapted to receive a request from said another server to send messages to push to talk clients via the push to talk server; wherein
the granting mechanism is adapted to handle the request from said another server in a manner so that no more than one of a push-to-talk client or said another server is permitted to send messages to push to talk clients within an enlarged chat group at a time; and
the push to talk server is adapted to respond to a request from said another server in a different manner than to a request from a push to talk client.

2. The push to talk server of claim 1, wherein the granting mechanism is adapted to give priority to a request received from said another server over requests received from a push to talk client.

3. The push to talk server of claim 1, wherein the push to talk server comprises a withdrawal mechanism adapted to determining when to withdraw the permission to send messages from said another server to push to talk clients after having granted said permission to said another server.

4. The push to talk server of claim 3, wherein said withdrawal mechanism comprises a monitor for monitoring a variable parameter, and wherein said withdrawal mechanism is adapted to compare, in said determining, the value of said variable parameter with a pre-determined value.

5. The push to talk server of claim 4, wherein said monitor comprises a counter, and said variable parameter is the number of chat messages received from said another server.

6. The push to talk server of claim 4, wherein said monitor is a timer and said variable parameter is the time lapsed since said permission was granted to said another server.

7. The push to talk server of claim 4, wherein said push to talk server comprises a mechanism for dynamically determining said pre-determined number.

8. A chat server for forwarding chat messages in a computer network, the chat server comprising an interface for receiving, from chat clients, chat messages to be forwarded; an interface for transmitting chat messages to chat clients; an interface adapted to transmit chat messages to said push to talk server; and an interface adapted to receive push to talk messages from the push to talk server of claim 1, the chat server comprising:
an interface adapted to send, to said push to talk server, a request for permission to send chat messages to push to talk clients; and wherein
the chat server is adapted to forward said chat messages to said push to talk server only when the chat server has said permission.

9. The chat server of claim 8, wherein said chat server comprises storage for a push to talk identity and wherein said interface adapted to send a request for permission is adapted to include said push to talk identity in said request.

10. The chat server of claim 8, the chat server further comprising a mechanism for determining when to send a request for permission to send chat messages to push to talk clients.

11. The chat server of claim 10, wherein said mechanism comprises a counter for counting how many chat messages have been received since the permission to send was last withdrawn.

12. The chat server of claim 8 wherein
the interface adapted to receive push to talk messages is adapted to receive push to talk messages from the push to talk server, and wherein
the chat server comprises a withdrawal mechanism adapted to determine when to withdraw the permission to send chat messages from said chat server after having received said permission from said push to talk server.

13. A communications network comprising a push to talk server according to claim 1 and a chat server.

14. The communications network of claim 13, further comprising a text/speech converter for converting chat messages into speech, and for converting push to talk messages into text.

15. A method of acquiring inter-operability between a push to talk server in a mobile radio network and chat server in a computer network, the push to talk server for forwarding push to talk messages to and from push to talk clients and the chat server for forwarding chat messages to and from chat clients, said method comprising:
after a chat session is established for communicating chat messages to and from the chat clients,
sending a request message, from the chat server to the push to talk server, for permission to send chat messages to push to talk clients; and
sending, when the chat server has said permission, a chat message from the chat server to the push to talk server for forwarding to at least one push to talk client.

16. The method of claim 15, wherein the method further comprises
monitoring a first variable parameter;
comparing the value of said first variable parameter with a first pre-determined value; and
when the value of said first variable parameter equals said first pre-determined value, withdrawing said permission from the chat server.

17. The method of claim 16, wherein said first pre-determined value and/or said second pre-determined value vary as the ratio of forwarded push to talk messages and forwarded chat messages varies.

18. The method of claim 15, wherein the method further comprises
monitoring a second variable parameter;
comparing the value of said second variable parameter with a second pre-determined value; and when the value of said second variable parameter equals said second pre-determined value, performing said step of sending a request.

19. The method of claim 15, wherein the request message comprises an identity identifying the chat server to the push to talk server as an entity to which permission to send messages may be granted.

20. A method of operating a chat server in a communications network comprising the chat server and at least one chat client, a chat client being capable of sending chat messages to other chat clients via the chat server, the method comprising the following steps:
after a chat session is established for communicating chat messages to and from the chat clients,
a) receiving a chat message from a chat client;
b) sending the chat message to other chat clients;
c) sending, to a push to talk server in the communications network, a request for permission to send chat messages to push to talk clients in the communications network;
d) receiving permission to send chat messages to push to talk clients; and
e) sending, in response to the step of receiving permission, the chat message to the push to talk server.

21. A method of operating a push to talk server in a communications network comprising the push to talk server and at least one push to talk client, a push to talk client being capable of sending push to talk messages to other push to talk clients via the push to talk server, the method comprising the steps of:
after a chat session is established for communicating chat messages to and from the chat clients,
a) receiving a request from a push to talk client to send push to talk messages;
b) receiving a push to talk message from a push to talk client;
c) sending the push to talk message to other push to talk clients;
d) sending the push to talk message to a chat server in the communications network;
e) receiving a request from the chat server to send messages to push to talk clients via the push to talk server; wherein the push to talk server responds differently to the request received from the chat server than to the request received from the push to talk client.

22. A non-transitory computer program product for communicating messages in a communications network comprising push to talk clients capable of sending push to talk messages and a push to talk server having a granting mechanism for granting permission to push to talk clients to send push to talk messages, the non-transitory computer program product comprising:
computer program code which, when run on a computer, forwards push to talk messages, received from push to talk clients, to a chat server;
computer program code which, when run on a computer, can receive, from a push to talk client, a request for permission to send chat messages to other push to talk clients; computer program code which, when run on a computer, can receive, from the chat server, a request for permission to send chat messages to push to talk clients; and
computer program code which, when run on a computer, can grant said permission to the chat server in response to said request in a manner so that no more than one of a push-to-talk client or said another server is permitted to send messages to push to talk clients within an enlarged chat group at a time;
computer program code, which, when run on a computer, can respond differently to a request from chat server than to request from a push to talk client.

23. A non-transitory computer program product for communicating messages in a communications network comprising chat clients capable of sending chat messages and a chat server capable of forwarding the chat messages to chat clients, the non-transitory computer program product comprising:
computer program code which, when run on a computer, can send, to a push to talk server, after a chat session is established for communicating chat messages to and from the chat clients, a request for permission to send chat messages to push to talk clients;
computer program code which, when run on a computer, can receive said permission from the push to talk server; and
computer program code which, when run on a computer, forwards chat messages, in response to receiving said permission, to the push to talk server.

* * * * *

UNITED STATES PATENT AND TRADEMARK OFFICE
CERTIFICATE OF CORRECTION

| | | |
|---|---|---|
| PATENT NO. | : 7,899,478 B2 | Page 1 of 1 |
| APPLICATION NO. | : 11/667722 | |
| DATED | : March 1, 2011 | |
| INVENTOR(S) | : Fodor | |

It is certified that error appears in the above-identified patent and that said Letters Patent is hereby corrected as shown below:

In Fig. 4:1, Sheet 4 of 8, for Tag "440", in Line 1, delete "withdraw" and insert -- withdrawn --, therefor.

In Column 18, Line 23, in Claim 12, delete "claim 8" and insert -- claim 8, --, therefor.

In Column 18, Line 52, in Claim 16, delete "comprises" and insert -- comprises: --, therefor.

In Column 18, Line 64, in Claim 18, delete "comprises" and insert -- comprises: --, therefor.

Signed and Sealed this
Nineteenth Day of July, 2011

David J. Kappos
*Director of the United States Patent and Trademark Office*